(12) United States Patent
Tirloni et al.

(10) Patent No.: US 7,166,005 B2
(45) Date of Patent: Jan. 23, 2007

(54) SURFING PARAMETERS GAUGE AND TRANSFER APPARATUS

(76) Inventors: Salvador Francisco Tirloni, Barauna, 1038, Parque São Jorge Itacorobi, Florianópolis SC 88034-450 (BR); Avelino Arantes Bastos, Maria Madalena Bilk, 20, Bairro Campeche, Florianópolis SC 88063-780 (BR)

( * ) Notice: Subject to any disclaimer, the term of this patent is extended or adjusted under 35 U.S.C. 154(b) by 0 days.

(21) Appl. No.: 10/544,702

(22) PCT Filed: Feb. 25, 2004

(86) PCT No.: PCT/BR2004/000045

§ 371 (c)(1),
(2), (4) Date: Aug. 5, 2005

(87) PCT Pub. No.: WO2004/076990

PCT Pub. Date: Sep. 10, 2004

(65) Prior Publication Data

US 2006/0194485 A1    Aug. 31, 2006

(30) Foreign Application Priority Data

Feb. 25, 2003   (BR) .................................. 0300620

(51) Int. Cl.
*A63C 5/03* (2006.01)

(52) U.S. Cl. ...................................... 441/74; 73/178 R

(58) Field of Classification Search ............... 441/74; 73/178 R
See application file for complete search history.

(56) References Cited

U.S. PATENT DOCUMENTS

| 4,498,410 | A | * | 2/1985 | Budge ...................... 114/91 |
| 4,586,374 | A |   | 5/1986 | SaynjaKangas |
| 4,955,835 | A | * | 9/1990 | Hollingsworth ............. 441/74 |
| 7,037,153 | B1 | * | 5/2006 | Wynne ...................... 441/74 |

FOREIGN PATENT DOCUMENTS

| DE | 197 18 917 |   | 5/1999 |
| EP |     95040  | * | 11/1983 |
| WO | WO 83/02515 |  | 7/1983 |

* cited by examiner

*Primary Examiner*—Stephen Avila
(74) *Attorney, Agent, or Firm*—Hedman & Costigan, P.C.

(57) ABSTRACT

SURFING PARAMETERS GAUGE AND TRANSFER APPARATUS is a velocity, time and space covered by a surfboard measurement apparatus or any other similar solid body, comprising a multifunction module(2) enclosing a sensor adapted to pick up the surfboard displacement related to the water, transforming the data into electrical signals and send them to processing data unit. The multifunction module (2) comprising a housing(11) embedded in the surfboard(1) hull having inside a capsule(10) swiveling related to the housing; and capsule(10) having an external geometric sphere-shaped lobe(4) and a truncated cylinder stem radially connected to the sphere.

5 Claims, 4 Drawing Sheets

SURFING PARAMETERS GAUGE AND TRANSFER APPARATUS

FIELD OF THE INVENTION

It relates to a measurement apparatus comprising a capsule housing a sensor adapted to pick up the surfboard displacement related to the water, transform the received data into an electrical signal and send it to a data processing unit.

BACKGROUND OF THE INVENTION

Presently bodies moving in fluid medium velocity measurements are proceeded in laboratory to evaluate the body's hydrodynamic lines, moving resistance areas and fluid-friction losses. The tests simulate the body's relative movement related to the fluid. The body stays put and the fluid flows around. The measurement instruments and gauges being used in laboratory simulated tests do not apply on measurements when the body is a surfboard and is moving in real time and places. Presently "field" measurements can not be done, i.e., with the surfboard moving in real time and places, by not existing measurement apparatus that being affixed to the surfboard wouldn't significantly impair nowadays outstanding parameters to the surfboard performance such as the surfboard own weight, motion resistance, surfer's positioning and others.

DESCRIPTION OF THE PRIOR ART SUMMARY OF THE INVENTION

PI0106598-0 filed in INPI/Brazil on Dec. 28, 2000 describes a telemetrical system for surfboards and correlatives. It shows a inventive idea functional aspects and a block diagram having acquisition, transmission, storage and information data subsystems.

SUMMARY OF THE INVENTION

The surfing parameters gauge and transfer apparatus hereby described is affixed to the surfboard and it has the function of picking up, instantaneously and in real time, the surfboard's relative velocity related to the water in contact. The data from the instantaneous velocity vector are transmitted to a computer, which using a specific software, processes and send informations as to the surfboard's modules of velocity and direction related to the water flow, presents useful informations for the equipment's technical performance analysis comprising the surfboard and accessories as well as to proceed biodynamic studies, to store up informations for contest judgments and also to create a databank for a multimedia play game development.

Operatively, the surfing parameters gauge and transfer apparatus has a multifunction module installed on the surfboard and a receiving and data processing unit—CPU. The multifunction module has a lobe connected to two potentiometers, one micro-controller and a radio frequency transmission set; the lobe displacement due to the surfboard displacement related to the water, is transformed into an electrical signal by the potentiometers; the electrical signal is transformed and enhanced by the micro-controller that sends the data to the radio frequency transmission set. A fix station onshore is the receiving and transmitting data unit—CPU; it comprises a radio receiving set that receives the radio frequency signal and sends the data to a computer. This one having a specific software, which is not a subject of the present patent application, that processes and sends informations.

DESCRIPTION OF THE PREFERRED EMBODIMENT

Figure 1:
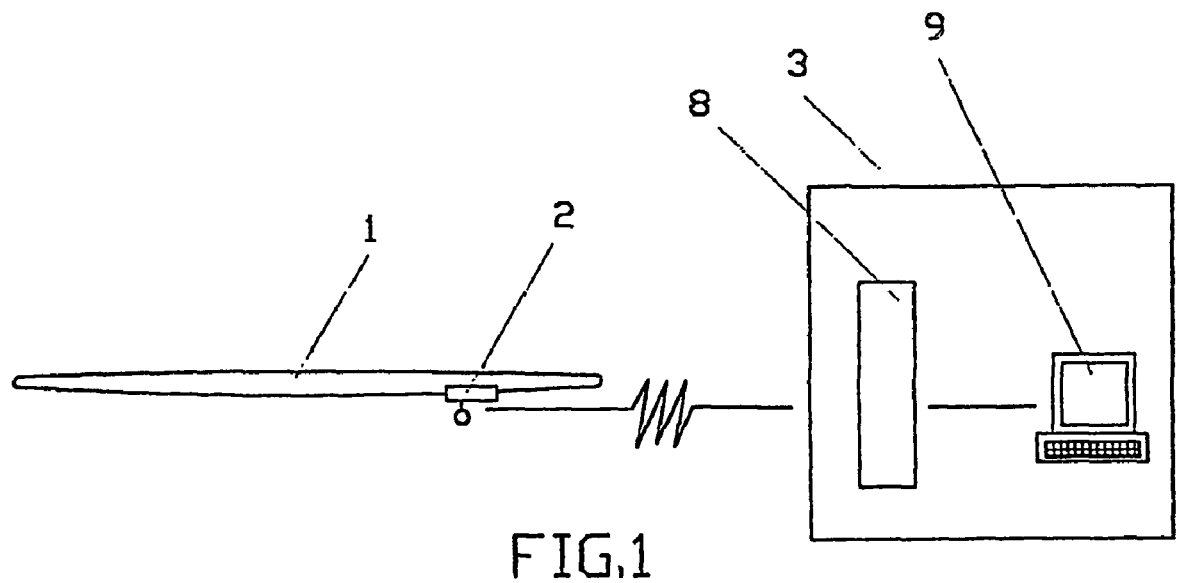
FIG. 1 shows in a schematic way the surfboard(1) with the multifunction module(2) embedded on the surfboard's hull; it shows the fix station(3) with the radio receiving set(8) and the computer(9).
Figure 2:
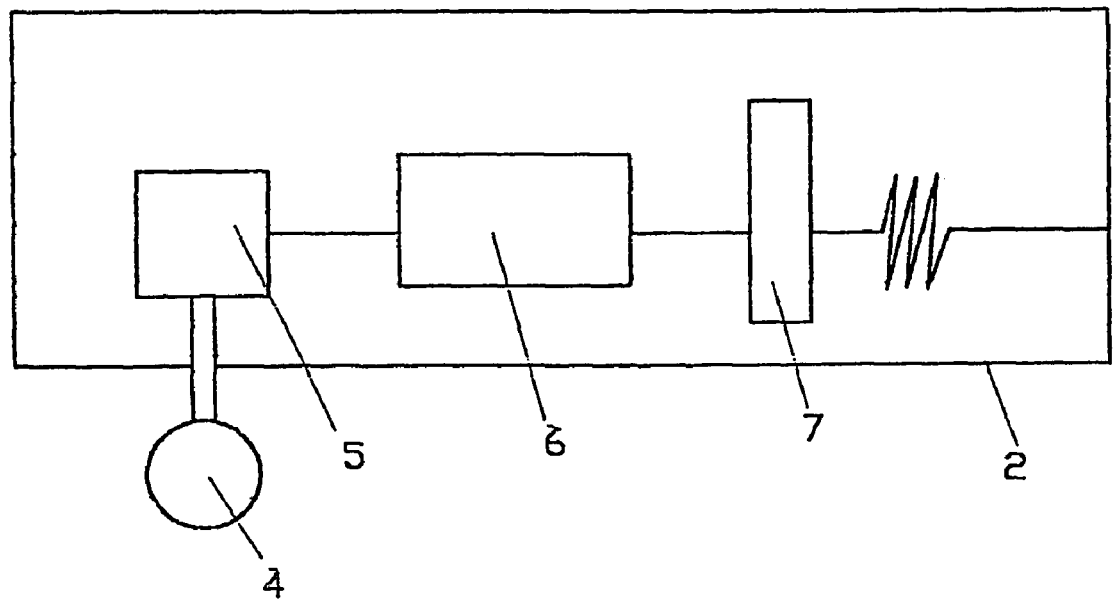
FIG. 2 shows in a schematic way the multifunction module(2) with the sub modules: the spherical lobe(4), the potentiometers(5), the micro controller(6) and the radio transmitting set(7).
Figure 3:
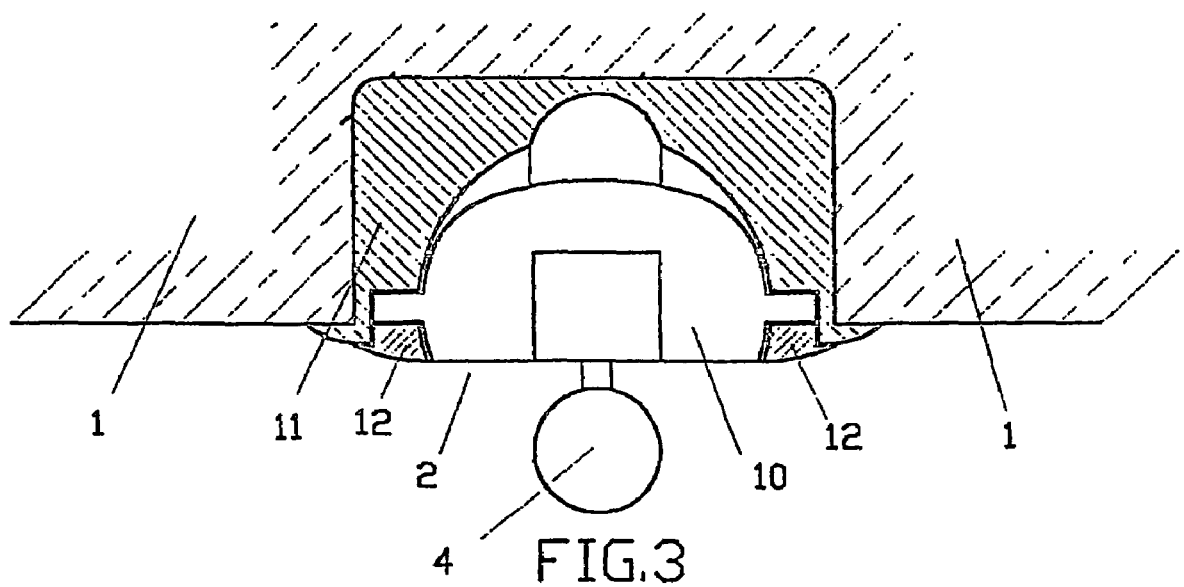
FIG. 3 shows in a schematic way a cross-section view of the surfboard(1) seeing the multifunction module(2) embedded in the surfboard(1) hull. The multifunction module(2) comprises a capsule(10), a housing(11) and a retainer ring (12). The capsule(10) encloses the potentiometers(5), the micro controller(6) and the radio transmitting set(7). One can see the spherical lobe(4) on the capsule(11) external side; the capsule(10) is placed inside housing(11); it shows the retainer ring(12) that holds capsule(10) inside housing (11).
Figure 4:
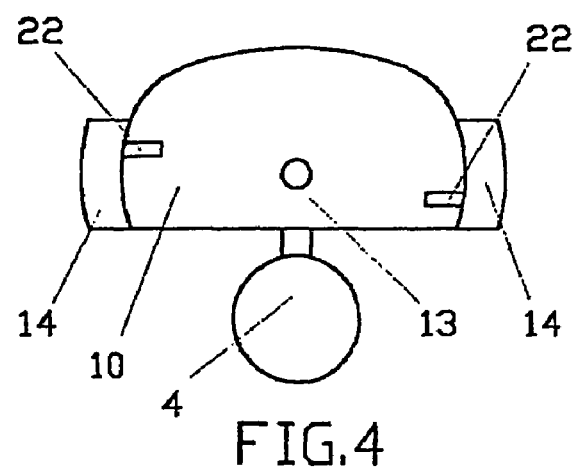
FIG. 4 is a side view of capsule(10) having two shafts(13), two filling brims(14), two grooves(22) on the capsule(10) body; also shows the spherical lobe(4) external to capsule (10).
Figure 5:
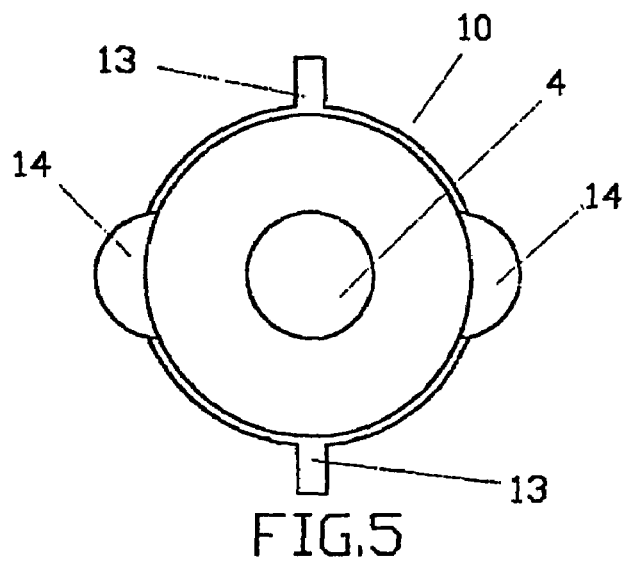
FIG. 5 is a top view of capsule(10) having two shafts(13) and two filling brims(14); it shows the spherical lobe(4) external to capsule(10).
Figure 6:
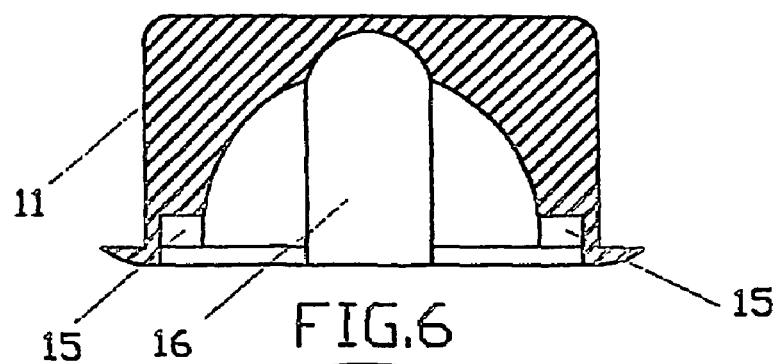
FIG. 6 is a cross-section view of housing(11) with bearings(15) for supporting shafts(13); with trough(6) that houses spherical lobe(4).
Figure 7:
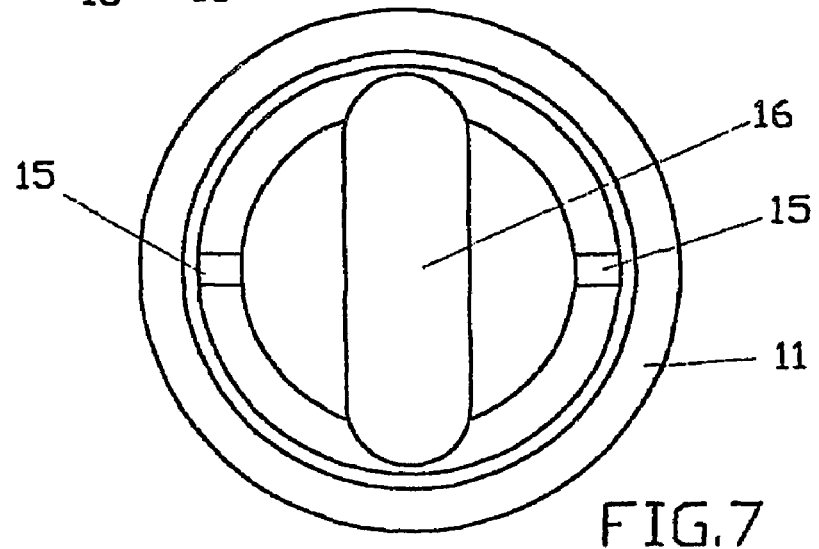
FIG. 7 is a front view of housing(11) with bearings(15) for supporting shafts(13); with trough(16) that houses spherical lobe(4).
Figure 8:
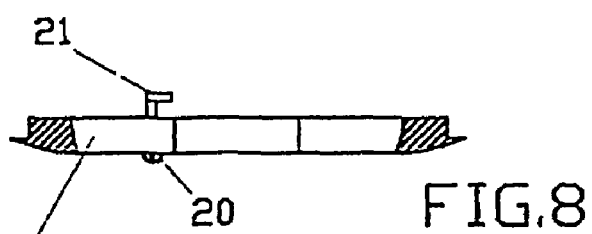
FIG. 8 is a cross-section view of retainer ring(12) with screw(20) having a latch(21) at its end tip.
Figure 9:
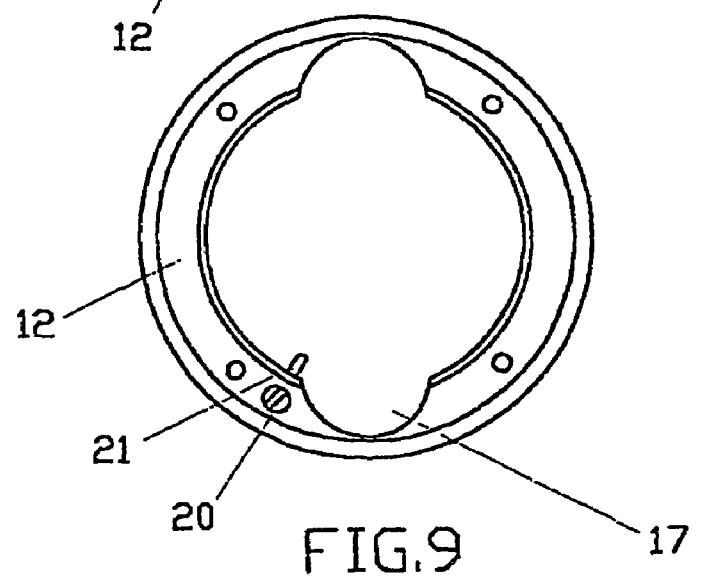
FIG. 9 is a front view of retainer ring(12), with two cavities(17) having the cross-section similar to the cross-section of trough(16); it shows screw(20) with latch(21) at its end tip.
Figure 10:
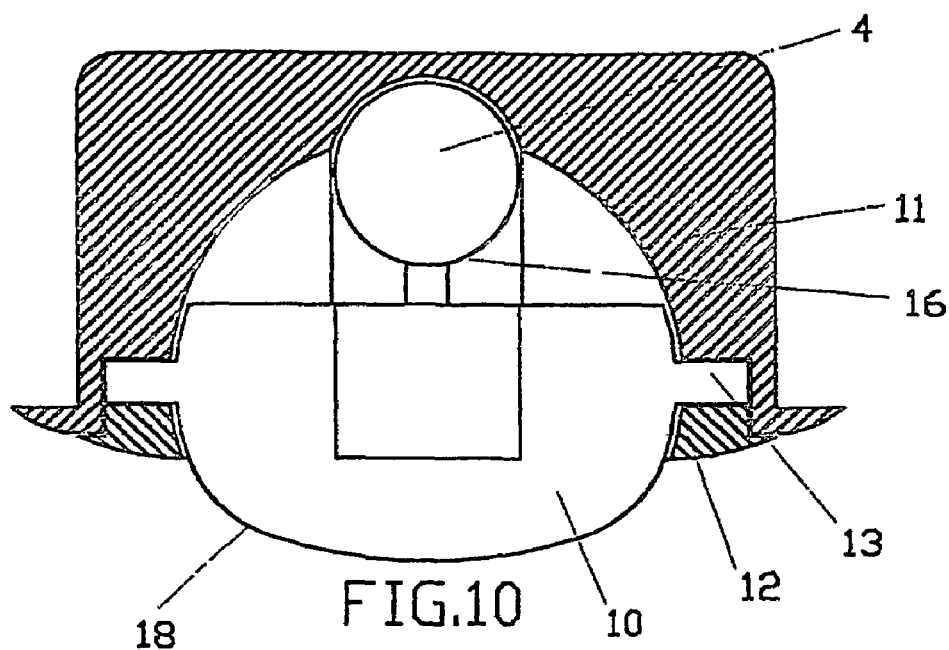
FIG. 10 is a cross-section view of housing(11) where capsule(10) has been turned 180 degrees; it is in the surfboard transportation position. The spherical lobe(4) is housed and protected inside housing(11). The cover(18) of capsule(10) is the side that stays exposed outside housing (11).
Figure 11:
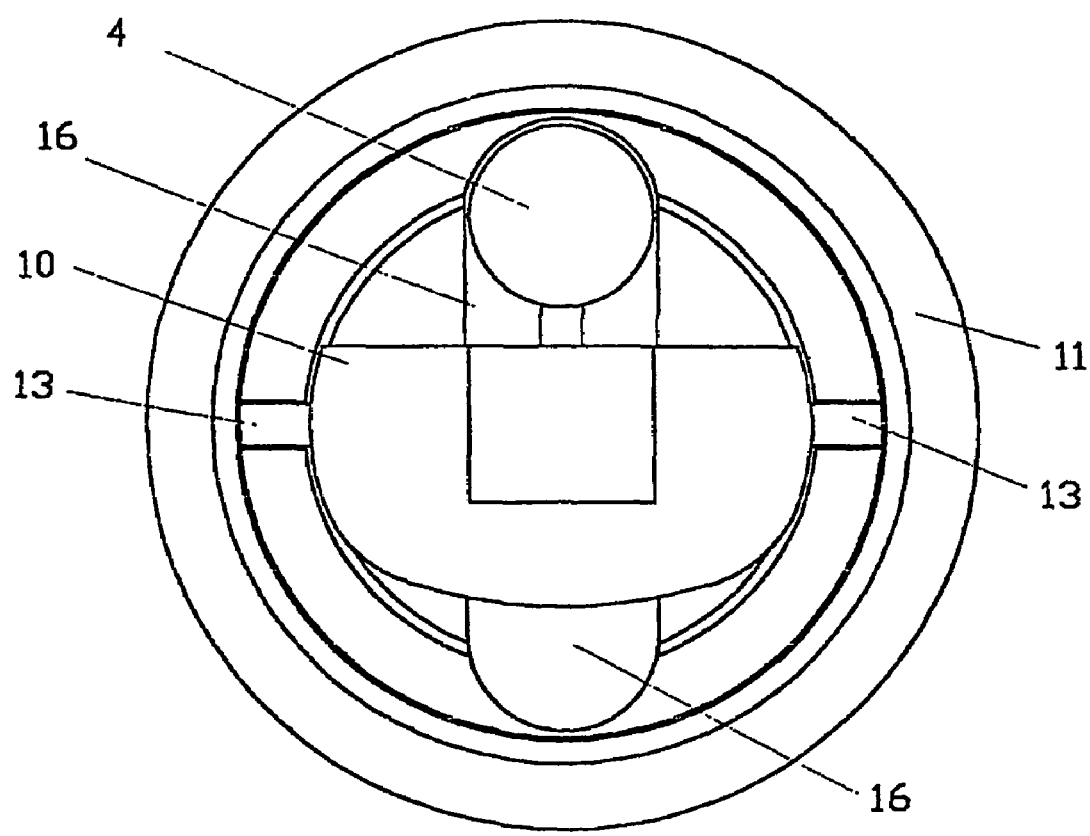
FIG. 11 is a front view of multifunction module(2) where capsule(10) has been turned 90 degrees. One can see that trough(16) has a cross-section sufficiently equal to spherical lobe(4).

During assembly, housing(11) is permanently embedded into the hull of surfboard(1). Capsule(10) is fitted into housing(11) so shafts(13) stay on bearings(15). The retainer ring(12) is screwed to housing(11) body to avoid loosening capsule(10). Capsule(10) can swivel on shafts(13) having the function of positioning spherical lobe(4) into a work position, external to capsule(10) and external to housing (11); or into a transportation and surfboard handle position, inside housing(11). The fixing of capsule(10) with the spherical lobe(10) inside or outside it is accomplished by turning screw(20) that locks capsule(10) by action of latch (21) entering one of the existing grooves(22) on the body of capsule(10). The sphere-shaped lobe(4) has a stem connecting the spherical surface to capsule(10) inner part; the stem has a knee joint at its end inside capsule(10).

To perform measurements the surfboard(1) is displacing on the water and the spherical lobe(4) is immersed into the water. The water's kinetic energy presses spherical lobe(4) resistant spherical surface, which leans in relation to the stem axis having the knee joint as rotation center. The knee joint is inside capsule(10) and is connected to the potentiometers(5), like a joystick. When the kinetic water pressure stops an elastic spring force makes the spherical lobe(4) return to its original position. The potentiometers(5) register vector's displacement coordinates XY along time unit; data are then picked up by micro-controller(6), transformed and sent to the fix station(3) through radio frequency.

The sphere-shaped lobe(4), which offers resistance to the water displacement, is the invention's outstanding characteristic cause the spherical shape offers equal resistance to the displacement whichever the water displacement direction is related to the surfboard(1).

Description of the Alternative Embodiments

The parameters gauge and transfer apparatus has been described in this report as affixed to a surfboard just as an example of real application and for the inventive act better understanding. Its application can be extended to other equipments and vehicles moving on water, in the air or any other fluid medium. The parameters gauge and transmitting apparatus hereby described may be installed in equipments like windsurf board, kite surf board, wakeboard or body board, boats or other navigable vehicles.

The apparatus' manufacture is viable because most of the sub modules are already available at the existing prior art.

The invention claimed is:

1. SURFING PARAMETERS GAUGE AND TRANSFER APPARATUS where the board displaces on the water and being affixed to surfboard body a multifunction module (2) comprising said multifunction module(2) being formed by a capsule(10) fitted inside a housing(11); said capsule(10) having potentiometers(5) inside it connected to the stem of a spherical lobe(4) external to capsule(10); said capsule(10) having inside a micro controller(6) that receives electrical signals from the potentiometers(5); said capsule(10) having inside a radio transmitting set(7) that receives signals from the micro controller(6); and said capsule(10) being kept fitted inside housing(11) by action of a retainer ring(12) fixed to housing(11) body.

2. SURFING PARAMETERS GAUGE AND TRANSFER APPARATUS as claimed in claim 1, where the multifunction module(2) is fixed to a solid body moving in a fluid medium.

3. SURFING PARAMETERS GAUGE AND TRANSFER APPARATUS as claimed in claim 1, where the capsule (10) swivels in relation to housing(11) around shafts(13) tips of said capsule(10), and said shafts(13) tips staying on bearings(15) inside housing(11) body; could the swiveling of said capsule(10) be stopped by a screw(20) located at the retainer ring(12) that transversally presses said capsule(10) body.

4. SURFING PARAMETERS GAUGE AND TRANSFER APPARATUS as claimed in claim 1, comprising the geometric shape of lobe(4) being a sphere with a radial stem and having on the other stem's end a knee joint connected to potentiometers(5).

5. SURFING PARAMETERS GAUGE AND TRANSFER APPARATUS as claimed in claim 1, comprising said spherical lobe(4) contacting the fluid medium where the multifunction module(2) displaces.

* * * * *